United States Patent Office
3,449,072
Patented June 10, 1969

3,449,072
SYNTHESIS OF FINELY DIVIDED OXIDE POWDERS
Mark Phillips Freeman, Darien, Conn., assignor to American Cyanamid Company, Stamford, Conn., a corporation of Maine
No Drawing. Continuation-in-part of application Ser. No. 383,947, July 20, 1964. This application July 27, 1967, Ser. No. 656,316
Int. Cl. C01f 7/02; C01b 35/00; C01g 23/04
U.S. Cl. 23—142                                    7 Claims

ABSTRACT OF THE DISCLOSURE

This invention relates to the preparation of refractory metal oxides by the oxidation of a salt of the metal corresponding to the desired oxide. In accordance with the present invention, the temperature in the zone in which the reaction between oxygen and the metal salt is initiated, is maintained sufficiently high to prevent precipitation of the oxide product therein and yet low enough to permit rapid cooling of the oxide vapor in a quenching zone contiguous with said reaction zone. In other words, the temperature in the initial reaction zone is high enough to prevent a state of supersaturation with respect to the oxide product and formation of any other solid and liquid particles which can serve as centers of nucleation.

---

This application is a continuation-in-part of application Ser. No. 299,465, filed Aug. 2, 1963, and application Ser. No. 383,947, filed July 20, 1964, both of which are now abandoned.

This invention relates to the provision of finely divided powders of refractory oxides. More particularly it relates to the provision of powdered metal (including metalloid) oxides by an improved high temperature process of oxidizing a vaporous metal salt with gaseous oxygen to yield, almost quantitatively, the corresponding oxide in the form of a high quality powder of uniform fine division. Still more particularly, this invention relates to a continuous oxidation wherein oxygen and vaporous salt are made so hot before or during the oxidative conversion that the temperature within the reaction zone is too high for any solid oxide particles to form in the zone of reaction, but low enough to allow for immediate oxide precipitation once the vaporous oxide product leaves said zone. This combination of conditions—a reaction zone free of precipitated oxide particles . . . or any other nonvaporous substance, and oxide vapor just at, or above precipitation temperature at the point of exit from the reaction zone—leads to many advantages, as will be apparent from the following description.

Refractory (i.e., high melting) oxide powders such as powdered alumina, silica, titanium dioxide, antimony oxide and boric oxide are widely known for various commercial applications. While such oxides can be obtained from mineral sources without resort to chemical synthesis, special applications sometimes require a degree of purity or a range of particle sizes which can better be attained when the oxides are chemically synthesized. Thus, powdered aluminum oxide suitable for gem manufacture must be scrupulously pure and exceptionally finely divided. Thus far, only chemically synthesized alumina has satisfied these requirements on a large enough scale to be significant. Likewise, silicon dioxide in its naturally occurring form is too coarse and impure for use as a rubber reinforcing material or as a thixotropic extender for paint, although high quality, very finely divided silica obtained from chemical conversion of silicon salts is widely used for these purposes. Similarly, it is not always commercially feasible to use rutile directly for titanium pigments, but resort must be made to chemical synthesis when considerations of purity and particle size are significant factors. The oxides produced in the process of this invention are of a sufficiently uniform small size of below 0.1 micron which permits their use as thixotropic extenders for paints and as rubber reinforcing materials.

Refractory oxides have been chemically synthesized from their inorganic salts by various vapor phase oxidation or hydrolysis procedures, all of which have in common the steps of contacting streams of vaporized inorganic salt, and oxygen or water vapor in a "high temperature" reaction zone for a time sufficient to permit the salt-forming anion to be displaced with oxygen, and collecting the resulting oxide particles by agglomeration and/or filtration of the reaction zone effluent.

In the straight oxidation methods, these being the earliest commercial procedures, the vaporous salt and oxygen, with nothing added, are brought to reaction temperature by an external heat source and combustion yields the powdered oxide, which though pure, is not optimal from the standpoint of particle size or uniformity.

The "hydrolysis" method of preparing oxides overcomes and avoids some of the disadvantages resulting from the oxidation method. In the hydrolysis procedure, for example, used to prepare silicon dioxide from silicon tetrachloride, the silicon salt is admixed with a combustible gas and oxygen and raised to reaction temperatures. The combustible gas burns with the production of water vapor. The water vapor, at the high temperatures of reaction, hydrolyzes the silicon salt to silicon dioxide. Droplets of water vapor serve also to act as centers of precipitation for the silicon dioxide produced. Thus, instead of particle growth as formed in the oxidation process, only small particles of the oxide are obtained, which result is desirable. While the hydrolysis method is capable of producing excellent product, it is not the full answer to the commercial preparation of refractory oxides. In this procedure, the water which is present in the reaction zone combines with the chlorine which is liberated from the silicon chloride to produce hydrogen chloride. This product cannot be recycled directly for production of more silicon chloride, but, rather, is discarded. In straight oxidation processes, chlorine is obtained and can be recycled for the production of more silicon chloride.

In view of the foregoing state of the art, it is an object of the present invention to provide an economical and efficient method for obtaining refractory oxides such as silicon, titanium, aluminum, etc., oxides wherein the advantages of the oxidation method are attained without its disadvantages. More specifically, it is an object of the present invention to oxidize a metal salt at extremely high temperatures to produce very finely divided oxide powders of high chemical purity.

These and other objects are attained in accordance with the present invention by reacting a metal salt with oxygen at temepratures sufficiently high to avoid precipitation of the desired oxide in the zone wherein oxygen and the metal salt initially reach equilibrium, while low enough to permit rapid cooling of the oxide vapor once it has left this reaction zone and entered a quenching zone. In other terms, the temperature of the initial reaction zone is high enough whereby said zone is not in a state of supersaturation with respect to the oxide product, and, at the same time, other conditions are maintained such that said zone is entirely free of either solid or liquid particles which can serve as centers of nucleation. While it is not intended to limit the present invention to any theoretical considerations, it appears that there is a logical explanation for the very desirable ends obtained therefrom. As stated before, the reaction of oxygen and the metal salt is exothermic. As conventionally carried out, maximum temperatures in the reactor are intentionally maintained low enough to permit oxide precipitation in any section of the reaction zone. As the oxidation reaction proceeds, at these conventionally low temperatures, particles of oxide are formed. These first particles act as centers of reaction and further oxidation of the salt preferentially tends to occur thereat. Since precipitation temperatures exist, these oxide particles continue to grow in size with the resultant formation of a high percent of large particles. If reaction-zone temperatures are raised only slightly above the temperature required to initiate reaction, this may not avoid the problem of large oxide particles as long as such particles are permitted to condense at the site where oxidation initiates and primarily occurs. In fact, a slightly elevated temperature acts to make precipitation of the oxide even more gradual, and this factor induces large particle formation. The critical part of the present invention is, therefore, the substantial absence of oxide precipitation in the initial reaction zone wherein oxidation yields an equilibrium product.

When operating according to the present invention, the oxide-containing effluent is brought to a quenching zone where it can be quickly cooled to a state of supersaturation with minimal interference or heating effect from the oxidation exotherm. This complete separation of initial reaction zone from precipitation zone distinguishes the present invention from previously known oxidation methods. The products obtained by the process of this invention are characterized by extremely small particle size. By the process of this invention, oxide powders are attained composed of particles uniformly in a range below 0.1 micron and more usually below 0.05 and as low as .02–.03 micron or even smaller.

The process of this invention is suitable for the preparation of refractory oxides of chromium, beryllium, zirconium, cobalt, nickel, cadmium, molybdenum, vanadium and especially aluminum, silicon, titanium and boron, from halide and oxyhalide salts thereof, excluding fluoride and oxyfluoride compounds but including the chlorides, bromides, iodides, mixed halides, oxychlorides, oxybromides, oxyiodides and mixtures thereof. Thus, the salts employed herein are derived from halide having an atomic weight above 19. It is especially applicable to the preparation of silicon dioxide from silicon tetrachloride.

Carryng out the oxidation process of the present invention does not entail the use of special equipment. Any available high temperature reactor can be employed. Suitable for this purpose are conventional plasma jet or arc torch reactors of the type described in U.S. Letters Patents 2,806,124 and 2,858,411. These reactors, as is well-known, are capable of producing a high density plasma stream of extreme high temperature. This plasma stream is conveniently used to raise the reactants used herein (i.e., oxygen and metal salt) to required temperatures. The plasma stream may be formed with any gas inert to oxidation such as argon, nitrogen or oxygen itself.

The salt which is to be converted to the oxide, is preferably the halide or the oxyhalide with the exclusion of fluorides, of the metal or metalloid element desired to be oxidized. Representative suitable salts are the chlorides, bromides or oxychlorides of silicon, titanium, aluminum, boron or antimony. Mixed halides may also be used, for example, silicon bromide trichloride but excluding mixed halides which have fluorine.

The salt and oxygen may be preheated before being brought into contact with each other in the high temperature reaction zone, although this is not necessary. The temperature at which the reactants are contacted, must be above that required to induce the oxidation reaction and also high enough so that no solid oxide can precipitate in the reaction zone. For each one mole of metal salt, it is preferred to have at least two moles of oxygen. A slight excess is desirable, but a large excess of oxygen may be employed, if desired.

The exact temperature of the reaction zone will depend upon many factors, and, because of extreme heat-loss under high temperature conditions, the temperature will vary along the path of reaction, becoming lower as the reaction mixture flows from the beginning to the end of the reaction zone. Whatever may be the characteristics of the reactor employed, the initial temperature of the reaction zone must be such that, at the end of the zone, temperature is above precipitation temperature for the oxide product. In order to illustrate the method of arriving at the temperature to be employed, it may be useful to take the case where the reactor is a plasma jet torch. The hot-flowing plasma can be adjusted to any tempearture as low as 2,000° C., or as high as 50,000° C. which tempearture is proper will depend upon the throughput rate of the oxygen and metal salt, the temperature required to keep the oxide in vaporous form, and, to a lesser extent, the heat produced by the reaction exotherm. Taking these factors into consideration, the initial temperature of the plasma must be sufficient so that its heat content will raise the temperature of the reacants above precipitation temperature for the oxide to keep it above this critical temperature throughout the reaction zone.

In following the process of this invention, the reaction product leaving the initial reaction zone can be cooled to below oxide precipitation temperature very rapidly since cooling will not be significantly retarded by reaction exotherms. Because of the minimization of exothermic effects in the quenching zone, cooling can be effected with excellent control. The most convenient method of cooling the reaction products so as to precipitate the oxide is to allow the reaction zone effluent to expand into the atmosphere with or without the entrainment of cooling gases. At the exit of the reactor, as rapid a quench as possible should be employed to obtain more finely divided and, hence, valuable product. One excellent quench is to permit the turbulent entrainment of cold product gas. Alternatively, one might inject such a cold gas into the reactor stream at the exit through a number of peripherally arranged, radially directed orifices. Precipitated oxide can be collected by filtration through a ceramic filter or by conventional agglomeration methods.

The following examples are presented to further illustrate the present invention. In these examples, use is made of a Thermal Dynamics, Inc., plasma jet generator, model L40. All volumes are measured under standard temperature and pressure.

EXAMPLE 1

Preparation of silicon dioxide

An argon plasma was caused to flow through a 15 cm. reaction tube at the rate of 0.35 liter per second. The plasma had a heat content of 10,250 joules per liter (S.T.P.) and a temperature of 10,000° C. At a point 1.43 centimeters downstream of plasma entry, silicon tetrachloride was introduced at a rate of 0.013 liter per second and 5 centimeters downstream of plasma entry, oxygen was introduced at the rate of 0.026 liter per second. Temperature at the exit point of the reactor measured 3,570° C. The oxide containing gas was permitted to expand and cool to below oxide precipitation temperature. Silicon dioxide particles in the size range of .02–.03 micron were collected almost quantitatively. The product was chemically pure silicon dioxide.

EXAMPLE 2

Preparation of silicon dioxide

Following the procedure of Example 1 except for the use of a nitrogen plasma with a flow rate of 0.383 liter per second and an entry temperature of 7,000° C., 0.274 liter per second of silicon tetrachloride was oxidized to silicon dioxide with 0.33 liter per second of oxygen. The temperature of the product stream at the reaction zone exit, was 3,570° C. The silicon dioxide which was collected was excellent grade, chemically pure oxide powder having a particle size of .02–.03 micron.

EXAMPLE 3

Titanium dioxide

Following the procedure of Example 2, titanium tetrachloride is readily oxidized to chemically pure, finely divided titanium dioxide powder.

The substitution of aluminum, boron and antimony salts in the procedure of Example 1, leads to aluminum, boron and antimony oxides, respectively, all in the form of a very finely divided powder.

EXAMPLE 4

This example illustrates the greatly improved results, relative to product size, obtained by the process of this invention as compared with relatively lower temperature processes which low temperature processes do not fully vaporize products and reactants in the reaction zone. The results set forth in the table were obtained by oxidizing $SiCl_4$ to produce $SiO_2$ by heating in an argon plasma. The temperature was varied between runs.

TABLE

| | Feed Rate | | | Net power (watts) | Average entrance temp., ° C. | Average exit temp., ° C. | Product Properties | | | | |
|---|---|---|---|---|---|---|---|---|---|---|---|
| Run | Argon (liters S.T.P./sec.) | $SiCl_4$ (mole/sec.) | $O_2$(mole/sec.) | | | | Surface area, m.²/gm. | Size A.[1] Range | Peak | Yield, wt. percent | Appearance |
| A | .35 | .586 | 1.2 | 2,539 | 4,589 | 1,972 | 102 | 100–1,200 | 200–400 | 36.5 | Fairly white. |
| B | .35 | .582 | 1.2 | 3,130 | 7,164 | 3,081 | 44 | 200–1,600 | 400–800 | 58.3 | Do. |
| C | .35 | .416 | 1.2 | 3,627 | 8,503 | 3,570 | 171 | 100–400 | 200–300 | 82 | Very white. |

[1] As measured by electron microscope distribution.

It is apparent that Run C, which employed a temperature sufficiently high (8503–3570° C.) to maintain the products and reactants in vapor form in the reaction zone, was the only satisfactory run since this was the only run wherein a product was obtained having a particle size uniformly below 0.1 micron.

I claim:
1. A process of preparing finely divided refractory oxides the particle size of which is uniformly not greater than 0.05 micron which comprises reacting oxygen with a halogen salt of a metal, said halogen having an atomic weight above 19 in the vapor phase, the oxidation reaction being initiated and conducted at a temperature sufficiently high to prevent the precipitation of oxide in the zone in which the oxidation reaction is initiated, whereby said zone is not in a state of supersaturation with respect to the oxide product and said zone is free of solid and liquid particles which can serve as centers of nucleation; quickly cooling the gaseous reaction product, thereby precipitating the metal oxide; and collecting said oxide as a very finely divided powder.

2. A continuous vapor phase process for the preparation of finely divided refractory oxides the particle size of which is uniformly not greater than 0.05 micron, which comprises reacting oxygen and a vaporized metal halide salt, the halogen of said halide salt having an atomic weight above 19, in a stream of hot plasma inert to oxidization; maintaining the temperature of the reaction mixture sufficiently high to prevent formation of solid oxide in the zone in which the oxidation reaction is initiated, whereby said zone is not in a state of supersaturation with respect to the oxide product and said zone is free of solid and liquid particles which can serve as centers of nucleation; quickly cooling the reaction product, thereby precipitating the oxide in finely powdered form; and recovering said oxide as a very finely divided powder.

3. A continuous vapor phase process for the preparation of a very finely divided oxide powder the particle size of which is uniformly not greater than 0.05 micron, which comprises reacting oxygen and a vaporous halide salt of a metal or a metalloid, the halogen of said halide salt having an atomic weight above 19, which is a member of the group consisting of silicon, aluminum, titanium, boron and antimony in a stream of hot plasma inert to oxidation to form a reaction mixture; maintaining the temperature of the reaction mixture sufficiently high to prevent formation of solid oxide in the zone in which the oxidation reaction is initiated, whereby said zone is not in a state of supersaturation with respect to the oxide product and said zone is free of solid and liquid particles which can serve as centers of nucleation; quickly cooling the reaction product, thereby precipitating the oxide in very finely powdered form; and recovering the very finely powdered oxide.

4. The process of claim 3 wherein the salt is a chloride of silicon.

5. The process of claim 3 wherein the metal is aluminum.

6. The process of claim 3 wherein the metal is titanium.

7. The process of claim 3 wherein the reaction mixture contains at least two moles of oxygen for each mole of the halide salt.

References Cited

UNITED STATES PATENTS

| 2,347,496 | 4/1944 | Muskat et al. | |
| 2,791,490 | 5/1957 | Willcox. | |
| 3,051,639 | 8/1962 | Anderson | 204—171 |
| 3,235,332 | 2/1966 | Woodhall | 23—142 X |
| 3,253,886 | 5/1966 | Lamprey et al. | 23—208 X |
| 3,275,411 | 9/1966 | Freeman et al. | |

OSCAR R. VERTIZ, Primary Examiner.

G. T. OZAKI, Assistant Examiner.

U.S. Cl. X.R.

23—144, 149, 182, 202; 106—288, 300, 303; 219—121